July 17, 1962 F. B. LITTON 3,044,946
HIGH DENSITY NUCLEAR FUEL COMPOSITION
Filed March 17, 1961

INVENTOR.
FELIX B. LITTON
BY

United States Patent Office 3,044,946
Patented July 17, 1962

3,044,946
HIGH DENSITY NUCLEAR FUEL COMPOSITION
Felix B. Litton, Killingworth, Conn., assignor to the United States of America as represented by the United States Atomic Energy Commission
Filed Mar. 17, 1961, Ser. No. 96,625
1 Claim. (Cl. 204—193.2)

This invention relates to high density nuclear fuel consisting essentially of uranium monocarbide.

Uranium monocarbide has long been regarded as a potentially important material for use as a fuel in nuclear reactors. The properties which make it particularly desirable for this application are its relatively high uranium atom density, its good thermal conductivity, and its remarkably good irradiation stability, even up to burn-ups of 15,000 megawatt days per metric ton. In addition, it is a compound which does not contain elements of high nuclear cross section. Also, as compared with uranium dioxide ($UO_2$), for example, uranium monocarbide (UC) has a four times greater thermal conductivity. Moreover, the uranium atom density of uranium monocarbide is 12.97 grams of uranium per cubic centimeter as compared with a figure of 9.66 for uranium dioxide.

Uranium monocarbide has the disadvantage of being much more difficult to make than uranium dioxide. A more serious objection is the fact that esssentially stoichiometric uranium monocarbide powder will be of low density no matter how long and at how high a temperature it is sintered. However, nuclear fuel applications require uranium monocarbide bodies having nearly theoretical density, isotropic properties and a uniformly face centered cubic matrix structure. This structure should contain no pores or internal cracks, and minimum discontinuities. I have found that by replacing carbon in the uranium monocarbide lattice with a combination of oxygen and nitrogen, high density intermetallic bodies are obtained having the desired properties for use as fuel in nuclear reactors. This new composition of matter consists of from about 2.2 to 4.6 weight percent carbon; 0.1 to 2.3 weight percent oxygen; 0.05 to 2.5 weight percent nitrogen and the balance uranium. The maximum oxygen content in the composition is restricted to less than half the carbon content.

My new composition of matter may be made by reacting uranium powder with a carburizing gaseous mixture containing known and controlled amounts of methane, hydrogen, oxygen and nitrogen at an elevated temperature. The resulting product is then pressed into a desired shape and vacuum sintered at a temperature of about 1700° C. for at least half an hour. The sintered product contains between 12.4 and 12.8 grams of uranium per cubic centimeter as compared with a theoretical density of 12.97 grams of uranium per cubic centimeter for uranium monocarbide.

The composition of matter of this invention is illustrated in the accompanying figures in which—

FIG. 1 and FIG. 2 are, respectively, photomicrographs of a high density uranium monocarbide composition magnified 100 times and 400 times respectively. These samples were produced from the methane reaction in accordance with this invention. The uranium carbide powder contains sufficient oxygen, nitrogen and free uranium to form a high density product of 13.69 grams per cubic centimeter. This compares with a theoretical density for stoichiometric uranium monocarbide of 13.63 grams per cubic centimeter.

Figure 1:
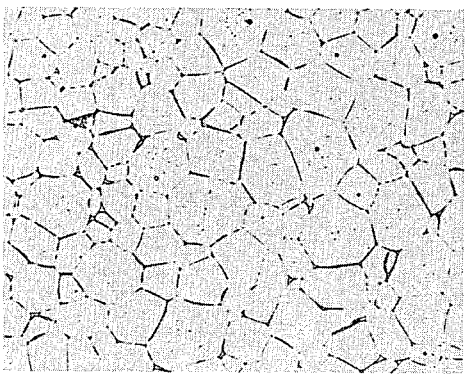

My invention may be understood in more detail from the following description.

Preparation of Uranium Hydride

Direct formation of uranium monocarbide by reacting massive uranium metal with methane proved unsatisfactory as the reaction rate was too slow. Carbide formed on the surface of the metal but the product did not break up to form a powder. It was therefore decided to first prepare uranium hydride by reacting uranium metal with dry hydrogen at 275° C. This process is well known and consists briefly pickling uranium metal in 50:50 nitric acid-water; rinsing in water and then alcohol; and drying. The metal is then inserted in a furnace under protection of an argon atmosphere. This atmosphere is replaced by dry hydrogen flowing at approximately 5 liters per minute. The temperature is increased to about 275° C. and the reaction is allowed to go to completion.

Preparation of Uranium Carbide Powder

Uranium carbide powder of the desired composition was next made by reacting the uranium hydride with a carburizing gas containing controlled amounts of oxygen and nitrogen. Initially, methane was used containing °.5% N and 0.2% O by volume. The reaction was conducted for periods of time varying between one-half and 8 hours and at temperatures between 600° and 900° C. The charge was then removed from the heat zone of the furnace, and the methane replaced with argon. Next the charge was removed from the furnace to a dry box under the protection of an argon atmosphere.

The product of the reaction was analyzed by X-ray diffraction for the relative amounts of UC, $UC_2$, U, $UO_2$ and C (graphite). The data showed that the product of the methane reaction was a mixture predominantly consisting of uranium metal, and uranium monocarbide, uranium monocarbide and dicarbide, or uranium metal, monocarbide and dicarbide depending on reaction time and temperature. The optimum time and temperature for preparing a product of desired analysis, that is, uranium monocarbide and relatively small amounts of uranium metal, was between 650° and 700° C. for from one-half to three hours reaction time.

Compacting and Sintering Uranium Monocarbide Powder

The carbide powder produced in the manner described above was next compacted and sintered. As the powder is pyrophoric, care must be taken to protect the powder from contact with air. Paraffine, camphor and cetyl alcohol, added to the powder in organic solvent solutions, may be used as lubricants and binders for compacting uranium monocarbide powders. Camphor, for example, may be added as a 3% solution in isopropyl alcohol; Paraffine as a 10% solution in benzine; and cetyl alcohol as a 5% solution in petroleum ether. Cetyl alcohol in the range of 0.5% to 1% cetyl alcohol added as the 5% solution in petroleum ether proved to be the most efficient lubricant and yielded the best compacts.

Pressing may be conduction at pressures between 5 and 50 tons per square inch. The higher pressures yield the highest green densities as shown from the following table:

| Compacting pressure, t.s.i.: | Green density, g./cm.$^3$ |
|---|---|
| 5 | 6.60 |
| 10 | 7.15 |
| 15 | 7.54 |
| 20 | 7.97 |
| 30 | 8.42 |
| 40 | 8.72 |
| 50 | 9.05 |

The compacted uranium carbide is then sintered at a temperature between about 1600° C. and 2000° C. in a vacuum of less than 1 micron for a period between one-half hour to 4 hours. Temperatures below 1600° C. appear insufficient for significant densification and sintering, whereas temperatures above about 2000° C. will result in volatilization of free uranium in the compact. Experiments showed that 1700° C. is an adequate temperature to produce a high density body using optimum composition powder.

Figure 2:
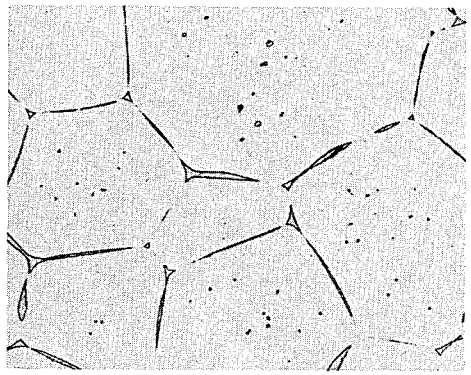

FIGS. 1 and 2 are illustrative of high density compositions of matter consisting essentially of uranium monocarbide made from uranium monocarbide powder produced by reacting uranium hydride with methane containing 0.5% N and 0.2% O by volume at a temperature of 675° C. The resulting powder was compacted and sintered at a temperature of 1700° C. for one-half hour. Upon analysis, the composition was found to consist of 4.16% carbon, 0.72% oxygen and 0.9% nitrogen and the balance uranium. X-ray diffraction analysis revealed only an uranium monocarbide structure. It is assumed that all the carbon, oxygen and nitrogen are present in an isomorphous solid solution, since this is the only explanation which will correlate the metallographic, X-ray diffraction and analytical data. The density of this composition is 13.69 grams per cubic centimeter as compared with the theoretical density of 13.63 grams per cubic centimeter.

In place of the carburizing mixture of the foregoing description, hydrogen may be added to suppress the formation of uranium dicarbide ($UC_2$) at temperatures above about 700° C. during carburization. With such a gas the optimum reaction temperature for forming a product consisting predominantly of uranium monocarbide is between 700° C. and 800° C.

A suitable carburizing gas is one consisting of 18% $H_2$, 81% $CH_4$, 0.01% $O_2$ and 0.6% $N_2$ by volume. Chemical analyses of uranium carbide powder produced at three different temperatures for 2-hour periods are as follows:

| Reaction Temperature, ° C. | Chemical Composition, Percent | | |
|---|---|---|---|
| | Carbon | Oxygen | Nitrogen |
| 800 | 5.65 | 0.67 | 0.07 |
| 800 | 5.15 | 0.77 | 0.12 |
| 750 | 4.96 | 1.25 | 0.14 |
| 750 | 4.40 | 0.55 | 0.13 |
| 700 | 4.64 | 0.72 | 0.04 |
| 700 | 3.96 | 0.65 | 0.15 |

It is to be observed from the above table that the carbon content of the carbide powder can be controlled by regulating the temperature and period of the reaction to keep the carbon content within the desired range of 2.2 to 4.6% by weight.

It was found that a high density sintered product can be produced over quite a range of carbon, oxygen and nitrogen contents, provided there is the right ratio of carbon, oxygen and nitrogen and the necessary amount of free uranium. This ratio is approximately 2.2 to 4.6 weight percent carbon, 0.1 to 2.3 weight percent oxygen and 0.05 to 2.5 weight percent nitrogen, wherein the oxygen does not exceed one-half the carbon content. Oxygen in excess of this ratio tends to form uranium oxide inclusions in the compacts.

Figure 4:
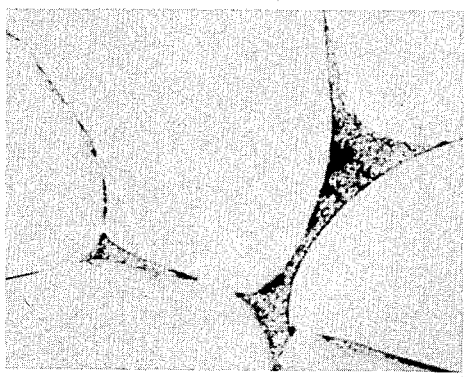
FIG. 4 is a photomicrograph of a high density uranium monocarbide compact magnified 400 times and showing an eutectic structure at the gram boundaries.
Figure 5:
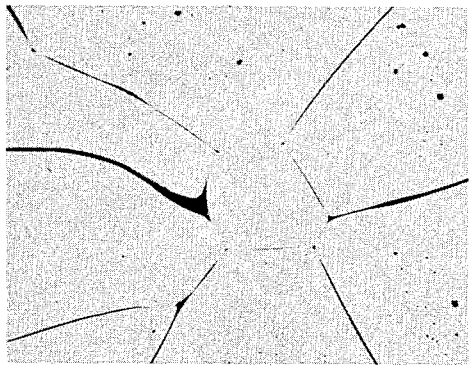
FIG. 5 is a photomicrograph of a high density compact adjusted in composition on the basis of carbon, nitrogen and oxygen content to contain 51 atomic percent uranium.

Compacts were produced with densities of 14.16 gm./cm.$^3$ which contained 2.85 weight percent carbon, 1.29 weight percent oxygen and 0.76 weight percent nitrogen. Other compacts having a density of 13.46 gm./cm.$^3$ were produced which contained 3.16 weight percent carbon, 1.22 weight percent oxygen and 0.76 weight percent nitrogen. Metallographic examination of the latter composition, shown in FIG. 4, is of particular interest in that it shows an apparent eutectic between uranium and the isomorphous uranium-carbon-oxygen-nitrogen solid solution.

Figure 3:
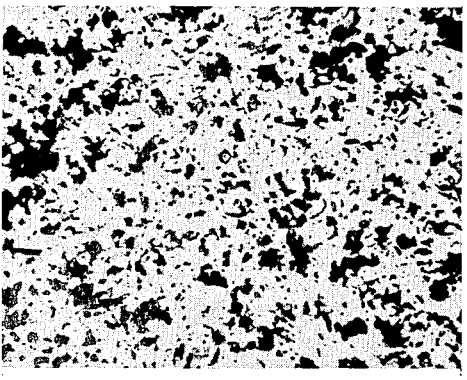
FIG. 3 is, by comparison with the foregoing, a photomicrograph of essentially stoichiometric uranium monocarbide produced from methane reduction powder and magnified 250 times. This sample has a carbon content of 4.86 weight percent and a density of 11.25 grams per cubic centimeter.

In contrast to the high density compacts obtained by the subject method, FIG. 3 illustrates essentially stoichiometric uranium monocarbide produced by methane reaction powder and containing 4.8 weight percent carbon. This compact had a density of only 11.25 grams per cubic centimeter after sintering for 3 hours at 1800° C.

In the foregoing examples, the oxygen and nitrogen were introduced in producing the uranium carbide powder by the methane reaction. To verify that the needed composition could be synthesized from methane-produced uranium powder which contains near stoichiometric carbon composition, samples were made from such powders which were adjusted in composition to contain about 1 to 1½ atomic percent uranium in excess of that required to satisfy the stoichiometry of the carbon, oxygen and nitrogen contents. Such a composition, for example, of 51 atomic percent uranium, is the equivalent of 95.2 weight percent uranium or 4.8 weight percent of the total carbon, oxygen and nitrogen. To do this, small quantities of uranium hydride powder were mixed with methane-produced uranium carbide powder containing almost precisely 4.8 percent carbon. The powder was compacted and sintered in the usual manner and found to yield the typical high density material. A sample of this compact is illustrated in FIG. 4.

In place of methane, propane can be used as the carburizing gas. In all cases however, the oxygen, nitrogen and carbon content of the uranium carbide powder should be within the disclosed limits of 2.2 to 4.6 weight percent carbon, 0.1 to 2.3 weight percent oxygen, 0.05 to 2.5 weight percent nitrogen and the balance uranium.

Having described my invention and the best known manner of practicing the same, I claim:

A nuclear fuel consisting essentially of uranium monocarbide and containing 2.2 to 4.6 weight percent carbon, 0.1 to 2.3 weight percent oxygen, 0.05 to 2.5 weight percent nitrogen, and the balance uranium, wherein the maximum oxygen content is less than one half the carbon content by weight and wherein said carbon, oxygen and nitrogen are present as a single phase substituted solid solution of UC, C, O, and N.

No references cited.